United States Patent [19]

Ulich et al.

[11] Patent Number: 5,249,046
[45] Date of Patent: Sep. 28, 1993

[54] METHOD AND APPARATUS FOR THREE DIMENSIONAL RANGE RESOLVING IMAGING

[75] Inventors: Bobby L. Ulich; Kent Pflibsen, both of Tucson, Ariz.

[73] Assignee: Kaman Aerospace Corporation, Bloomfield, Conn.

[21] Appl. No.: 859,217

[22] Filed: Mar. 30, 1992

[51] Int. Cl.⁵ .................................. H04N 7/18
[52] U.S. Cl. .......................... 358/95; 358/99; 358/109
[58] Field of Search ............. 358/93, 95, 99, 100, 358/109

[56] References Cited

U.S. PATENT DOCUMENTS 3,775,735 11/1973 Funk et al. ...................... 358/109
5,091,778 2/1992 Keeler .............................. 358/99

Primary Examiner—Howard W. Britton
Assistant Examiner—Richard Lee
Attorney, Agent, or Firm—Fishman, Dionne & Cantor

[57] ABSTRACT

A three dimensional range resolving imaging sensor is presented. The sensor comprises a transmitter for generating a light pulse which passes through beam homogenizer and a pair of Fresnel-Risley prisms. This pulse is then directed through an environmental window towards an object enveloped in a backscattering medium. A portion of the light pulse is reflected back towards the sensor. However, prior to detecting the return light pulse, a detector array is internally calibrated by exposure to a calibration pulse. This detector array preferably comprises a two-dimensional photo multiplier tube (PMT) array. A corresponding array of light tapers is disposed before the PMT array to increase the fill factor of the PMTs. Gain and offset corrections are made for each PMT from this exposure. The return pulse passes through the environmental window and impinges a pair of Fresnel-Risley scanner plates. These plates introduce a fixed angular deviation which is dependent on the orientation of the plates. This pulse then passes through a spectral bandpass filter and onto a collection mirror. The collected return pulse is then directed to the PMT array. The output of the PMT array comprises a plurality of electrical signals. These signals are conditioned and then processed by an image processor. The image processor provides a visual display which is available to an operator. Also, the image processor may perform automated target recognition and alert the operator when a target is detected.

28 Claims, 2 Drawing Sheets 5,249,046

METHOD AND APPARATUS FOR THREE DIMENSIONAL RANGE RESOLVING IMAGING

BACKGROUND OF THE INVENTION

The invention relates generally to imaging lidar (light detection and ranging) systems. More particularly, this invention relates to a method and apparatus for three dimensional imaging.

There is a continuing need to develop methods of detecting underwater targets from remote locations (e.g. airborne) and over relatively short time periods. This is of particular importance in the case of certain military applications where, for example, the detection of moored mines from helicopters and other aircraft is vital to ensuring safe seas. Presently, cumbersome and time consuming wire line devices must be used. These devices are lowered into the water and of course, are easily subject to damage and loss. Also, wire line devices make target searching relatively slow and can only detect targets without providing visual imaging for classification and identification.

In addition to detection of underwater mines, other military applications for underwater target detection systems include the detection of submarines and communication buoys. There are also a number of civilian applications for an accurate system for remote detection of underwater objects.

The prior art has addressed this problem with the imaging lidar system of U.S. Pat. No. 4,862,257 which is assigned to assignee hereof and incorporated in its entirety herein by reference. In accordance with the lidar system of U.S. Pat. No. 4,862,257, a laser is used to generate short pulses of light with pulse widths on the order of nanoseconds. The laser light is expanded by optics and projected down toward the surface of the water and to an object or target. Intensified CCD (charge coupled device) cameras (preferably two or more) are electronically shuttered after a time delay corresponding to the round trip propagation time to and from the target. This timing eliminates light scattered by the water from in front of and behind the target As a result, the veiling luminance of the water is greatly attenuated and faint target signatures can be seen. The resulting gated images (displayed on a CRT) have sufficient spatial resolution to classify and/or identify the target. This imaging feature offers the potential of reduced false alarm rates compared to non-imaging systems.

This imaging lidar system takes advantage of the fact that all opaque targets will cast a shadow. The exposure of the two cameras in the system are timed such that one camera gives an image of the target against the backscattered light from the water while the other camera gives an image of the shadow of the target against the backscattered light. These two images are then subtracted (e.g., differential imaging) to improve the detectability of the target. The subtracted image can then be colorized to assist in identification of the target.

In effect, the subtraction of the two images provides improved signal-to-noise ratio (SNR) of the imaged target. The SNR provided by the differential imaging is predicted by a theoretical model which is given by the detected target photons minus the detected water background photons over the square root of the sum of the detected photons from the target and twice the number of photons from the background.

Other examples of imaging lidar systems are disclosed in commonly assigned U.S. Pat. Nos. 4,964,721; 4,967,270; 5,013,917 and 5,091,778 all of which are incorporated by reference herein in their entirety.

The above prior art systems require the use of multigated two-dimensional images to obtain desired performance. In these prior art systems, sizes of small imaging arrays are limited by the maximum aperture of the collection optics which makes it necessary to use many sensors to obtain a large collection aperture and/or many time-resolved images. Accordingly, a need exists for an improved imaging system which is more compact and well suited for efficient light weight operation (e.g., aircraft on board imaging systems).

SUMMARY OF THE INVENTION

The above-discussed and other problems and deficiencies of the prior art are overcome or alleviated by the method and apparatus for three dimensional imaging of the present invention. In accordance with the present invention, a three dimensional range resolving imaging sensor system comprises a transmitter for generating a light pulse which passes through a beam homogenizer and a pair of Fresnel-Risley prisms. This pulse is then directed through an environmental window towards an object (e.g., target) enveloped in a backscattering medium. A portion of the light pulse (e.g., return light pulse) is reflected back towards the sensor.

However, prior to detecting the return light pulse, a detector array is internally calibrated. This calibration comprises splitting a small portion of the light from the light pulse. This calibration pulse is converted into a train of decreasing intensity pulses by means of a fiber optic power divider and a fiber optic delay loop. These calibration pulses are then directed onto the detector array. This array preferably comprises a two-dimensional photo multiplier tube (PMT) array. A corresponding array of light tapers is disposed before the PMT array to increase the fill factor of the PMTs. Gain and offset corrections are made for each PMT from this exposure.

The return pulse passes through the environmental window and impinges a pair of Fresnel-Risley scanner plates. These plates introduce a fixed angular deviation which is dependent on the orientation of the plates. This pulse then passes through a spectral bandpass filter and onto a collection mirror. The collected return beam is then directed onto the PMT array. The output of the PMT array comprises a plurality of electrical signals.

These signals are conditioned and then presented to a log amplifier circuit. The output of the log amplifier circuit is rapidly digitized and stored in a digital mass storage device. A timing circuit and a control circuit controls the timing sequence of operation. This stored digital signal is then processed by an image processor and presented to a visual display. The visual display is available to an operator. Also, the image processor may perform automated target recognition and alert the operator when a target is detected.

Accordingly, the time-resolved imaging system of the present invention provides a large number of time-resolved two-dimensional images with large signal dynamic range and sensitivity in a single compact package. This is a significant advantage over the prior art systems which required the use of multi-gated two-dimensional images to obtain similar performance. In the prior art, sizes of small imaging arrays limited the maximum aperture of the collection optics making it necessary to use many sensors to obtain a large collection aperture and/or many time-resolved images. The present system also incorporates a scanning technology which is compact and well suited for efficient light weight operation.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 3A-C are illustrative diagrams depicting the net deviation introduced by the Fresnel-Risley plates used in the system in FIG. 2, wherein FIG. 3A shows deviation in the same direction, FIG. 3B shows deviations in the opposite directions and FIG. 3C shows deviation in arbitrarily different directions.

DESCRIPTION OF THE PREFERRED EMBODIMENT

The present invention relates to a method and apparatus for three dimensional imaging. In accordance with the present invention, a light pulse is directed towards an object enveloped in a backscattering medium where a portion of the return light pulse is detected and processed for automated object recognition and/or visual display.

The sensor of the presented invention includes means for transmitting a light pulse, means for calibrating detector means prior to receiving a returned pulse and receiving/detector means This system will now be described in detail with reference to the several FIGURES.

Figure 1:
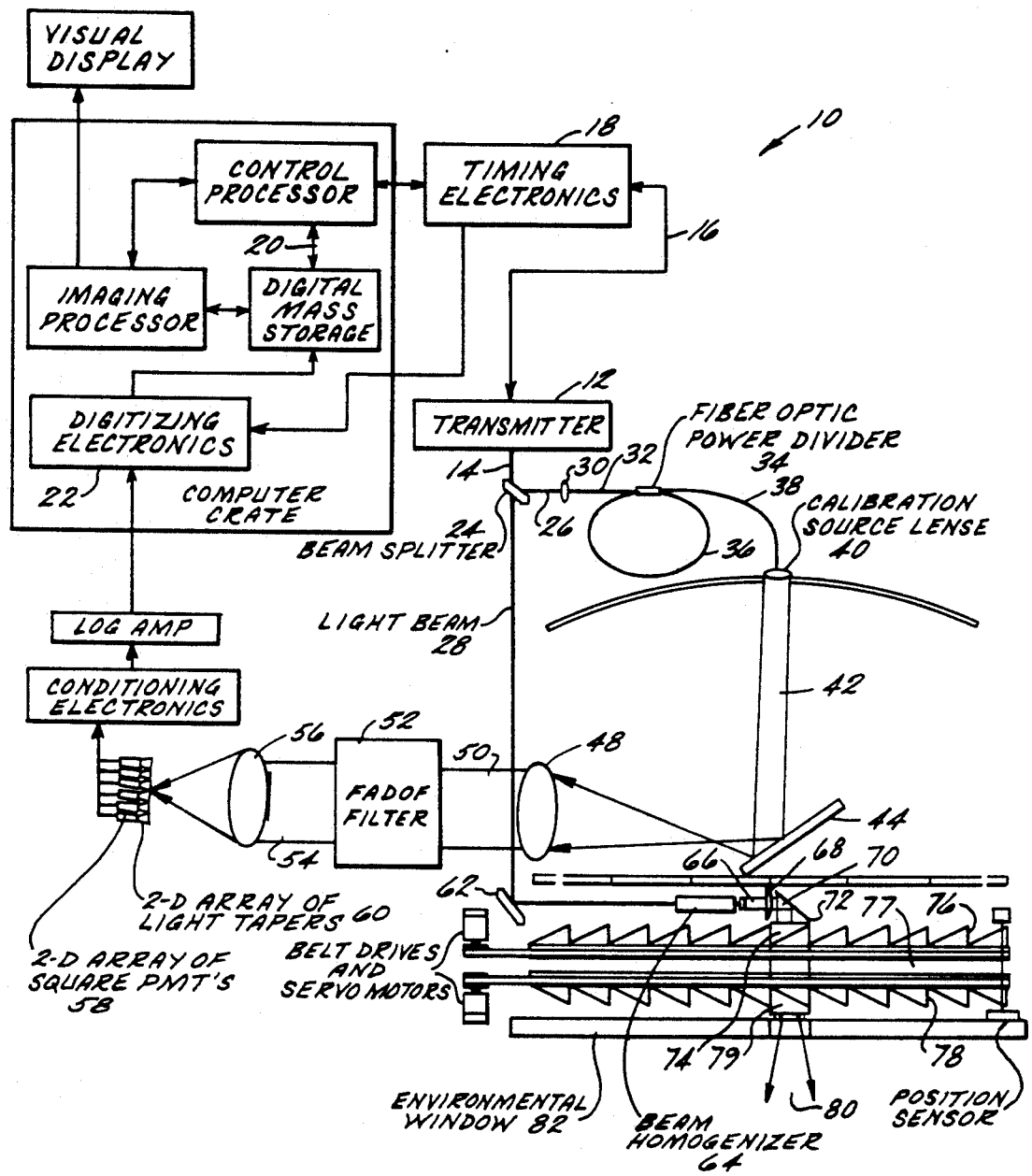
FIG. 1 is a block diagram depicting the three dimensional range resolving imaging sensor system during transmitting and calibration in accordance with the present invention.

Referring to FIG. 1, a three dimensional range resolving imaging sensor system is shown generally at 10. A transmitter 12 emits a pulse of light 14. A detector (not shown) located within transmitter 12 detects the generation of light pulse 14 and sends a signal on a line 16 to a timing electronics circuit 18 which starts a delay sequence. Timing electronics 18 generates an output signal on a line 20 which initializes a digitizing electronics circuit 22 after a preselected delay.

Light pulse 14 from transmitter 12 is split by a beamsplitter 24 into first and second light pulses 26 and 28. The majority of the energy in light pulse 14 remains in the second light pulse 28. Light pulse 26 is coupled by a lens 30 into a fiber optic cable 32. Fiber optic cable 32 is connected to a first input of a fiber optic power divider 34. Fiber optic power divider 34 includes two inputs and two outputs. A fiber optic loop 36 is also connected between a second input and a first output of fiber optic power divider 34. Fiber optic loop 36 comprises one or more loops of fiber optic cable. A second fiber optic cable 38 is connected to a second output of fiber optic power divider 34. Fiber optic power divider 34 allows a small fraction of light pulse 26 to propagate around loop 36 while most of pulse 26 is coupled into fiber optic cable 38. Each transit of light around fiber optic loop 36 results in most of that light being transmitted out of loop 36 and into fiber optic cable 38. This process is continuously repeated, whereby each time a small portion of the light is recirculated around the loop. Thus, a train of decreasing intensity pulses are emitted from the output end of fiber optic cable 38. However, if the light propagation time around loop 36 is less than the transmitter pulse 14 length, then the light output of loop 36 is continuous in time. In other words, loop 36 acts as a recirculating delay line.

A calibration source lens 40 coupled with the output end of fiber optic cable 38 diverges the optical pulse therein, generating a diverging beam 42 which impinges a flat secondary fold mirror 44. Mirror 44 directs beam 42 onto a field lens 48. A beam 50 emitted from field lens 48 impinges a Faraday Anomalous Dispersion Optical Filter (FADOF) 52 operating at a wavelength for optical transmission to be described hereinafter. The operation of FADOF 52 is described more fully in an article entitled Ultra High Noise Rejection Optical Filter, D. G. Dick and T. M. Shay, Optics Letters, Vol. 16, No. 11, June 1, 1991, pages 867-869. An example of a FADOF filter is described in commonly assigned U.S. patent application Ser. No. 761,065 filed Sep. 17, 1991, which is incorporated herein by reference. The use of FADOF 52 at this point is optional as will be described hereinafter. An output beam 54 from FADOF 52 impinges a second lens 56. Lens 56 is an imaging relay lens which transforms the collimated light passing through FADOF 52 filter into an image on a two-dimensional photo multiplier tube (PMT) array 58. An array 60 of light tapers is used to increase the 50-70% area fill factor of the PMTs to greater than 90%. This optical pulse train allows the PMT array to be calibrated within a known range of radiance values prior to each frame. The calibration pulse train illuminates the detector (i.e., array 58) after a transmitter pulse has left the sensor system (to be described hereinafter) and before the return from the distant object of interest is received. In this way, gain and offset corrections can be obtained for each PMT in array 58 for each transmitter pulse. These correction factors are stored and used to correct the signals generated by the return pulse described hereinafter. The range of intensities in the calibration pulse train is designed to cover the entire signal dynamic range of PMT array 58 and to provide a measure of the temporal response of each channel as well. The primary need of calibrating the PMT array 58 arises from the differences in PMT gain and offset from tube to tube and the changes in these quantities with temperature and age of the tubes. While a two-dimensional photo multiplier tube array 58 is preferred, other continuously readable optical detectors such as photodiodes may be employed without departing from the spirit and scope of the present invention. It will be appreciated that these other detectors will also require some form of calibration, preferably a method similar to the procedure described above. It should also be noted, that the array detector calibration self-normalizes for the transmitter pulse energy; that is, pulse-to-pulse transmitter energy variations are automatically compensated so that the sensor images will be of constant brightness independent of transmitter energy variations.

Transmitter light pulse 28 is directed by a mirror 62 onto a beam homogenizer assembly 64. Beam homogenizer assembly 64 is preferably of the type described in the United States application Ser. No. 750,572 filed Aug. 27, 1991 titled Laser Light Beam Homogenizer and Image Lidar System Incorporating Same, assigned to the assignee hereof and incorporated in its entirety herein by reference. A homogenized beam 66 emitted from homogenizer 64 is impinged on a field lens 68 generating a beam 70 which is directed by a mirror 72 onto a pair of Risley prisms 74 and 75 which are mechanically coupled to a pair of large area Fresnel-Risley plates 76 and 77. Prisms 74 and 75 are optically separated by a light tight tube baffle 78 from corresponding plates 76 and 77. Risley prisms 74 and 75 each comprise two thin prisms preferably comprised of glass and mounted so that they can be rotated simultaneously in independent directions. Such rotation changes the deviation of light beam therethrough. The tube baffle is necessary to prevent scattered light from an intense transmitter pulse 80 from blinding the highly sensitive PMT array 58. Light pulse 80 is emitted from the Risley prisms 74, 75 and passes through a section of an environmental window 82 with a second tube baffle to prevent the intense transmitter pulse 80 from blinding PMT array 58 upon return, as is described below.

A portion of light pulse 80 is reflected by an object of interest at various ranges from the sensor system 10 as is well known in lidar imaging systems. For example, U.S. Pat. No. 4,862,257 (described hereinbefore) discloses such a lidar system. In accordance with these known lidar imaging techniques, a return light beam is generated.

Figure 2:
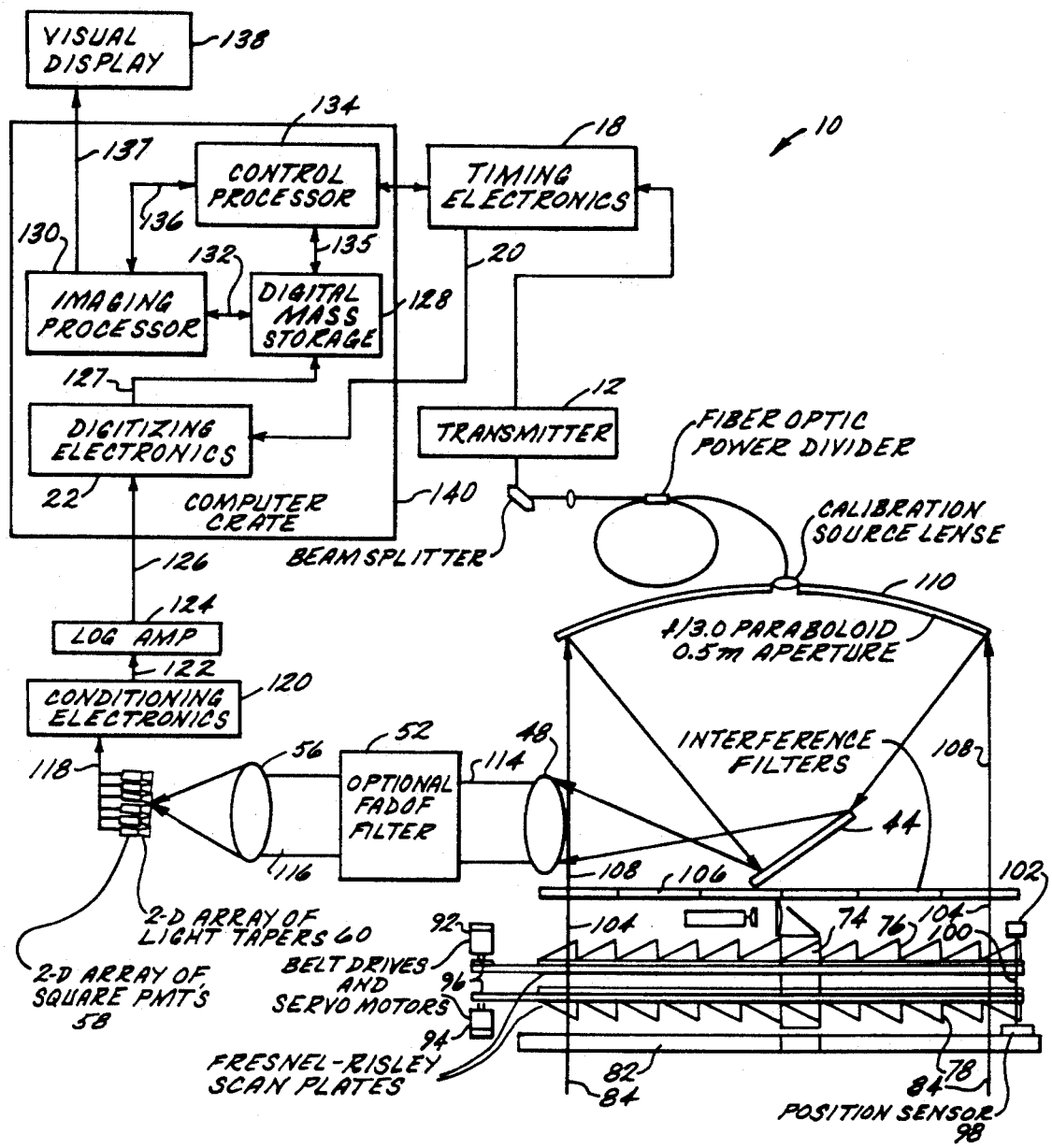
FIG. 2 is a block diagram depicting the three dimensional range resolving imaging sensor system during receiving in accordance with the present invention.

Referring to FIG. 2 a return light pulse 84 passes through environmental window 82 and impinges on Fresnel-Risley scanner plates 76 and 77. Plates 76 and 77 act as large aperture Risley prisms and introduce a fixed angular deviation into beam 84 which is incident on it. The angular deviation induced in return light pulse 84 by plates 76 and 77 is oriented in a direction opposite to the angular deviation induced by prisms 74 and 75 in transmitter pulse 80. Accordingly, the pulse 80 transmitted is deviated and then un-deviated when received as pulse 84. The magnitude of the deviation from one Fresnel-Risley plate is fixed, but the orientation of the deviation with respect to the optical axis of the sensor can be changed by rotating the plates 76 and 77 around an axis normal to their surfaces. Combining two of these plates 76 and 77 with equal deviations allows any location in a circular rotation with a radius of twice the deviation of single Fresnel-Risley plate to be accessed.

Figure 3A:
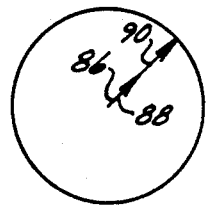
Figure 3B:
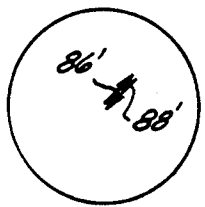
Figure 3C:
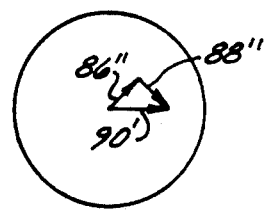

Three possible deviations are illustrated in FIGS. 3A–C. FIG. 3A shows the condition in which plates 76 and 77 are oriented with their deviation in the same direction. Accordingly, an arrow 86 indicating the deviation of plate 76 is disposed above an arrow 88 indicating the deviation of plate 77 which results in a net deviation indicated by arrow 90 which is twice the deviation of a single plate 76 or 77. FIG. 3B shows the condition in which plates 76 and 77 are oriented with their deviation in opposite directions, as indicated by arrows 86' and 88' resulting in no net deviation. FIG. 3C shows the condition in which plates 76 and 77 have deviations which are arbitrarily oriented with respect to each other, as indicated by arrows 86'' and 88'' with a net resulting deviation indicated by arrow 90'.

Fresnel-Risley scanner plates 76 and 77 are each independently controlled in rotation by corresponding servo motors 92 and 94. An important feature of the present invention is that small rotations of plates 76 and 77 around the axis in the plane of plates 76 and 77 do not change the deviation that plates 76 and 77 introduce into beam 84. Linear translation also has no effect on the amount of deviation. Accordingly, only one degree of freedom of scanner plates 76 and 77 must be controlled accurately. This degree of freedom is rotation of plates 76 and 77 around the normal of their surface. A zero backlash belt drive system 96 using high performance servo motors 92 and 94 will accomplish this feature. Each servo motor 92 and 94 has a high quality angle encoder (not shown) attached to its shaft (also not shown). The optical deviation of the combined plates 76 and 77 is measured by an optical position sensor 98. Position sensor 98 projects a beam 100 of light near the wavelength of beam 84 but sufficiently different so that scattered light from position sensor 98 is blocked by a sensor band pass filter (not shown). Position sensor beam 100 passes through both Fresnel-Risley plates 76 and 77 and is sensed by a two-dimensional position sensitive photodiode 102.

A beam 104 emitted from Fresnel-Risley plates 76 and 77 is incident on a large aperture multi-cavity Fabry-Perot spectral bandpass filter 106. Filter 106 is preferably composed of a mosaic of many small diameter filters to reduce overall fabrication costs, however other spectral filter technologies may be employed. Filter 106 is located adjacent to the Fresnel-Risley scanner plates 76 and 77 in order to reduce the maximum angle of incidence over which the filter 106 must operate. Filter 106 is also disposed in the large aperture beam 104 since the diameter of beam 104 will be reduced by subsequent optics and the angle of incidence variations will increase, thereby causing the spectral bandpass of filter 106 to increase in order to insure that the transmitter wavelength can be transmitted by filter 106. Multilayer dielectric filter 106 can be replaced by a wide-angle of acceptance FADOF which can be disposed in the reduced beam of the sensor system. A FADOF would offer the advantage of significantly narrower spectral bandpass and high out-of-bandpass rejection while providing high temperal response, large acceptance angles and good image quality.

A beam 108 emitted from filter 106 is focused by a large aperture parabolic collection mirror 110 onto mirror 44. Mirror 110 is preferably an f/3.0 paraboloid with a 0.5 m aperture. Also, other optical devices capable of focusing beam 108 onto mirror 44 may be used, e.g., refractive lenses. Mirror 44 diverts beam 108 to one side of the sensor which allows the sensor package to be more compatible with compact usage and allows the PMT hardware to be removed from the central area of the collection aperture. The field-of-view of the parabolic collection optics matches the staring field-of-view of PMT array 58. The location of Fresnel-Risley scanner plates 76 and 77 in beam 84 (i.e., prior to the focusing of beam 108 by collection mirror 110) significantly reduces the field-of-view over which collection mirror 110 must provide good imaging quality. The maximum field-of-regard of sensor system 10 can much larger than the field-of-view of collection mirror 110 in the configuration described herein. This significantly reduces overall costs and complexity of the sensor optics as compared to that of the prior art. However, one disadvantage of this method of obtaining a large field-of-regard is that any distortion introduced into the scanned field by the scanner cannot readily be corrected by optical methods, since no optics are located between the scanner and the scene of interest. Also, it should be noted that other scanning technologies could be used such as mirrors, acousto-optic deflector and polygon scanners.

The image produced by collection mirror 110 is collimated after reflection from mirror 44 by the short focal length, small f/number optic lens 48 to provide a small diameter collimated beam 114. Beam 114 is filtered by FADOF 52 to provided a filtered collimated beam 116. While use of FADOF 52 is preferred, it is not required for operation of the present invention The collimation optic lens 48 also relays the entrance of the pupil of system 10, located between Fresnel-Risley scanner plates 76 and 77, to the middle of the FADOF 52 gas cell (not shown). This minimizes the aperture of FADOF 52 and provides a symmetrical configuration of the collimation and imaging optics.

Beam 116 impinges the imaging relay lens 56 which transforms the collimated light passing through FADOF 52 into an image on PMT array 58. As described hereinbefore, array 60 of light tapers is used to increase the 50-70 area fill factor of the PMTs to greater than 90%. This also provides sufficient spacing between the PMTs to allow flexibility in mounting the PMTs to create array 58. PMT array 58 consists of a (nominally square) grid of miniature square PMTs. All of the PMTs are connected to the same high voltage power supply (not shown) and the heat by the PMTs is removed by conduction through the mounting structure (not shown). Since each PMT does not have its own independent high voltage power supply, the gain characteristics of each tube will be different. This necessitates use of the high dynamic range calibration method described hereinbefore to remove the effects of the tube-to-tube sensitivity differences. The outputs of PMT array 58 on lines 118 are presented to conditioning electronic circuits 120 which include amplification and temporal frequency bandpass filters. The outputs of conditioning electronic circuits 120 on lines 122 is presented to high bandwidth large signal dynamic range log amplifier circuits 124. The outputs of conditioning electronic circuit 120 are ideally matched to the input requirements of log amplifier circuits 124.

Output signals on line 126 from log amplifier circuits 124 are presented to an analog input of digitizing electronic circuit 22. Digitizing electronic circuit 22 is triggered by an electronic pulse originating from timing electronics circuit 18 over line 20. Timing electronic circuit 18 provides an accurate delay between the time light pulse 80 is transmitted from the system 10 and the start of the digitization of the signal on line 126 due to the detection of the strong calibration pulses.

Digitizing electronics 22 includes a high speed analog sampling array which stores values of the signal stream on line 126 at discrete time intervals. Output signals from digitizing electronics 22 on a line 127 are presented to an input of a digital mass storage device 128. After each pulse event (i.e., recirculated transmitted pulse 80 and received pulse 84) is captured, the analog samples are discretized and stored in digital mass storage 128 for access by imaging processor 130 via an interface bus 132. Digital mass storage 128 is multi-ported to allow digitizing electronics 22 to introduce recently collected data while image processor 130 and a control processor 134 access data already resident in mass storage device 128. Digital mass storage 128 and imaging processor 130 interface with control processor 134 via corresponding control lines 135 and 136.

Imaging processor 130 processes the digitized data stored in mass storage device 128 and produces a video signal on a line 137. The video signal on line 137 is compatible with an input of a visual display unit 138. Accordingly, a visual display is available to an operator at visual display device 138. Image processor 130 may also perform automated target recognition and alert the operator when a target has been detected, as is well-known in lidar systems.

Control processor 134 monitors the health and status of all sub-systems in sensor 10, sets delay times, power levels, PMT power supply voltages and scanner positions, directs imaging processor 130, and interacts with the operator. Control processor 134, imaging processor 130, digital mass storage 128 and digitizing electronics 22 are preferably located in a single computer crate 140.

Accordingly, the time-resolved imaging system 10 of the present invention provides a large number of time-resolved two-dimensional images with large signal dynamic range in uniform sensitivity in a single compact light-efficient package. This is significant advantage over the prior art systems which required the use of multi-gated two-dimensional images to obtain similar performance. In the prior art, the small sizes of imaging arrays limited the maximum aperture of the collection optics making it necessary to use many sensors to obtain a large collection aperture and/or many time-resolved images. The present system also incorporates a scanning technology which is compact and well suited to efficient light weight operation.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for detecting and imaging an object enveloped by a backscattering medium which is at least partially transmitting to light, the method comprising the steps of:

generating a light pulse of a first wavelength;

splitting said light pulse into first and second light pulses;

homogenizing said first light pulse to provide a third light pulse having a uniformly illuminated field-of-view;

inducing a first angular deviation in said third light pulse and projecting said third light pulse having said first angular deviation toward the backscattering medium and at the object enveloped by the medium, wherein a fourth light pulse is generated by the reflection of said third light pulse having said first angular deviation back from the object;

inducing a second angular deviation in said fourth light pulse, wherein said second angular deviation is oriented in a direction generally opposite to said first angular deviation;

filtering said fourth light pulse having said second angular deviation to provide a fifth light pulse;

generating a pulse train from said second light pulse;

converting photon energy received at an array of detectors from said pulse train into at least one first electrical signal and converting photon energy received at said array of detectors from said fifth light pulse into at least one second electrical signal; and processing said first electrical signal to determine compensating factors indicative of the differences in gain and offset between each of said array of detectors and processing said compensating factors and said second electrical signal to generate an imaging signal indicative of the object.

2. The method of claim 1 wherein said step of filtering said fourth light pulse having said second angular deviation comprises:
   a large aperture multi-cavity Fabry-Perot spectral bandpass filter.

3. The method of claim 1 further comprising the step of:
   in response to said imaging signal, generating a video image of said object.

4. The method of claim 1 wherein said step of processing comprises the steps of:
   conditioning said second electrical signal using conditioning electrical circuit means to provide a conditioned signal;
   amplifying said conditioned signal using log amplifier circuit means to provide an amplified signal;
   digitizing said amplified signal using digitizing circuit means to provide a digitized signal;
   storing said digitized signal using digital mass storage means;
   in response to timing circuit means, accessing said digitized signal from said digital mass storage means; and
   converting said digitized signal accessed from said digital mass storage means into said imaging signal using imaging circuit means.

5. The method of claim 1 wherein said step of inducing said first angular deviation comprises:
   a pair of Risley prisms.

6. The method of claim 1 wherein said step of inducing said second angular deviation comprises:
   a pair of large area Fresnel-Risley plates.

7. The method of claim 1 further comprising the step of:
   collimating said fifth light pulse to provide a small diameter collimated beam;
   filtering said collimated beam; and
   wherein said step of converting comprises converting photon energy received at said array of detectors from said collimated beam into said second electrical signal.

8. The method of claim 7 wherein said step of filtering said collimated beam comprises:
   a Faraday Anomalous Dispersion Optical Filter operating at said first wavelength of said light pulse.

9. The method of claim 1 wherein said array of detectors comprise:
   an array of two-dimensional photo multiplier tubes.

10. The method of claim 9 further comprising the step of:
    increasing the area fill factor of each of said two-dimensional photo multiplier tubes using a corresponding array of light tapers.

11. The method of claim 1 wherein said pulse train comprises a train of decreasing intensity pulses.

12. The method of claim 11 further comprising the steps of:
    (1) dividing an input light pulse into first and second portions, wherein said input light pulse is initially said second light pulse;
    (2) delaying said second portion wherein said second portion becomes said input light pulse; and
    (3) repeating steps (1) and (2), wherein said pulse train is generated.

13. The method of claim 1 further comprising the step of:
    controlling the amount of said first and second angular deviations induced in corresponding said third and fourth light pulses.

14. The method of claim 13 wherein said step of controlling comprises:
    an angle encoder;
    a servo motor responsive to said angle encoder; and
    a belt drive system driven by said servo motor.

15. The method of claim 13 further comprising the step of:
    measuring said second angular deviation, wherein said step of measuring comprises:
    generating a beam of light at a second wavelength, said second wavelength being sufficiently close to but different from said first wavelength;
    inducing said second angular deviation in said beam of light;
    filtering said beam of light having said second angular deviation to provide a filtered beam of light with substantially all wavelengths other than said second wavelength removed;
    sensing said filtered beam of light using a two-dimensional position sensitive photodiodes to provide a sensed position signal; and
    wherein said step of controlling is responsive to said sensed position signal.

16. A three dimensional range resolving imaging sensor for detecting and imaging an object enveloped by a backscattering medium which is at least partially transmitting to light, comprising:
    means for generating a light pulse of a first wavelength;
    means for splitting said light pulse into first and second light pulses;
    beam homogenizer means receiving said first light pulse and providing a third light pulse having a uniformly illuminated field-of-view;
    first prism means receiving said third light pulse and inducing a first angular deviation therein, said first prism means projecting said third light pulse having said first angular deviation toward the backscattering medium and at the object enveloped by the medium, wherein a fourth light pulse is generated by the reflection of said third light pulse having said first angular deviation back from the object;
    second prism means receiving said fourth light pulse and inducing a second angular deviation therein, wherein said first angular deviation is oriented in a direction generally opposite to said second angular deviation;
    filter means for filtering said fourth light pulse having said second angular deviation to provide a fifth light pulse;
    means for generating a pulse train from said second light pulse;
    an array of detectors for converting photon energy received from said pulse train into at least one first electrical signal, said array of detectors for converting photon energy received from said fifth light pulse into at least one second electrical signal; and
    processor means for determining compensating factors indicative of the differences in gain and offset between each of said array of detectors in response to said first electrical signal, said processor means responsive to said compensating factors and said second electrical signal generating an imaging signal indicative of the object.

17. The sensor of claim 16 wherein said filter means comprises:
a large aperture multi-cavity Fabry-Perot spectral bandpass filter.

18. The sensor of claim 16 further comprising:
means for generating a video image of said object in response to said imaging signal.

19. The sensor of claim 16 wherein said processor means comprises:
conditioning electrical circuit means for conditioning said second electrical signal to provide a conditioned signal;
log amplifier circuit means for amplifying said conditioned signal to provide an amplified signal;
digitizing circuit means for digitizing said amplified signal to provide a digitized signal;
digital mass storage means for storing said digitized signal;
timing circuit means for determining circuit timing, wherein said digitized signal is accessed from said digital mass storage means in response to said timing circuit means; and
imaging circuit means for converting said digitized signal accessed from said digital mass storage means into said imaging signal.

20. The sensor of claim 16 wherein said first prism means comprises:
a pair of Risley prisms.

21. The sensor of claim 16 wherein said second prism means comprises:
a pair of large area Feshnel-Risley plates.

22. The sensor of claim 16 further comprising:
an angle encoder;
a servo motor responsive to said angle encoder; and
a belt drive system driven by said servo motor.

23. The sensor of claim 16 further comprising:
means for measuring said second angular deviation, wherein said measuring means comprises:
means for generating a beam of light at a second wavelength, said second wavelength being sufficiently close to but different from said first wavelength, wherein said beam of light pass through said second prism means having said second angular deviation induced therein;
bandpass filter means for filtering said beam of light having said second angular deviation to provide a filtered beam of light with substantially all wavelengths other than said second wavelength removed;
a two-dimensional position sensitive photodiode for sensing said filtered beam of light to provide a sensed position signal; and
control means for controlling the amount of said first and second angular deviations induced by corresponding said first and second prism means in response to said sensed position signal.

24. The sensor of claim 16 wherein said means for generating said pulse train comprises:
fiber optic power divider means having first and second inputs, said first input receives said second light pulse, said fiber optic power divider means having first and second outputs, said fiber optic divider means for dividing said second light pulse into first and second portions, said first portion is available at said first output and said second portion is available at said second output; and
fiber optic delay loop means connected between said second output and said second input of said fiber optic power divider means, said second input of said fiber optic power divider means receives said second portion wherein a portion of said second portion is available at said first output of said fiber optic power divider means and wherein another portion of said second portion is available at said second output of said fiber optic power divider means, whereby said pulse train is generated at said first output.

25. The sensor of claim 16 further comprising:
means for collimating said fifth light pulse to provide a small diameter collimated beam;
means for filtering said collimated beam; and
wherein said array of detectors converts photon energy received at said array of detectors from said collimated beam into said second electrical signal.

26. The sensor of claim 25 wherein said means for filtering said collimated beam comprises:
a Faraday Anomalous Dispersion Optical Filter operating at said first wavelength of said light pulse.

27. The sensor of claim 16 wherein said array of detectors comprise:
an array of two-dimensional photo multiplier tubes.

28. The sensor of claim 27 further comprising:
an array of light tapers disposed adjacent to said array of two-dimensional photo multiplier tubes, said array of light tapers for increasing the area fill factor of each of said two-dimensional photo multiplier tubes.

* * * * *

UNITED STATES PATENT AND TRADEMARK OFFICE
CERTIFICATE OF CORRECTION

PATENT NO.    : 5,249,046
DATED         : September 28, 1993
INVENTOR(S)   : Bobby L. Ulich et al.

Page 1 of 1

It is certified that error appears in the above-identified patent and that said Letters Patent is hereby corrected as shown below:

Column 1,
Line 43, after "target", insert -- . --

Column 3,
Line 41, after "means", insert -- . --

Column 10,
Line 23, after "sensitive", delete "photodiodes" and insert therefor -- photodiode --

Column 11,
Line 34, after "area", delete "Feshnel-Risley" and insert therefor -- Fresnel-Risley --

Signed and Sealed this

Sixteenth Day of April, 2002

Attest:

JAMES E. ROGAN
*Attesting Officer*    *Director of the United States Patent and Trademark Office*